US00RE41644E

(19) United States
(12) Reissued Patent
Chang et al.

(10) Patent Number: US RE41,644 E
(45) Date of Reissued Patent: Sep. 7, 2010

(54) METHOD FOR OPTICAL MODULATION AT PERIODIC OPTICAL STRUCTURE BAND EDGES

(75) Inventors: William S. C. Chang, San Diego, CA (US); Paul K. L. Yu, San Diego, CA (US)

(73) Assignee: The Regents of the University of California, Oakland, CA (US)

(21) Appl. No.: 11/498,912

(22) Filed: Aug. 3, 2006

Related U.S. Patent Documents

Reissue of:
(64) Patent No.: 6,771,844
Issued: Aug. 3, 2004
Appl. No.: 09/962,517
Filed: Sep. 25, 2001

U.S. Applications:
(60) Provisional application No. 60/235,584, filed on Sep. 27, 2000.

(51) Int. Cl.
*G02F 1/00* (2006.01)

(52) U.S. Cl. ..... 385/2; 385/1; 385/15; 385/31; 385/14; 385/129; 385/37

(58) Field of Classification Search ..... 385/1, 385/2, 3, 10, 14, 31, 42, 39, 129, 130, 131, 385/132, 37
See application file for complete search history.

(56) References Cited

U.S. PATENT DOCUMENTS 4,007,978 A * 2/1977 Holton ..... 385/14
4,904,045 A * 2/1990 Alferness et al. ..... 385/37
5,131,000 A * 7/1992 Sugimoto et al. ..... 372/41
5,131,060 A * 7/1992 Sakata ..... 385/2
5,673,140 A * 9/1997 Fisher ..... 359/332
5,754,714 A * 5/1998 Suzuki et al. ..... 385/5
6,081,631 A * 6/2000 Brindel et al. ..... 385/1
6,771,844 B2 * 8/2004 Chang et al. ..... 385/2
2002/0097945 A1 * 7/2002 Chang et al. ..... 385/10
2003/0039446 A1 * 2/2003 Hutchinson et al. ..... 385/39

* cited by examiner

*Primary Examiner*—Brian M Healy
(74) *Attorney, Agent, or Firm*—Greer, Burns & Crain Ltd.

(57) ABSTRACT

In the band edge region, transmission and reflection of an optical wave can be made very sensitive to the change in radiation wavelength, a change in the modulator material refractive index, and/or a change in the material absorption. Controlling these parameters with the increased level of sensitivity is provided by modulation using the band edge region. A preferred embodiment method of the invention uses a periodic optical structure (i.e., a grating) on top of an optical waveguide structure. The combination of the periodic structure and the optical waveguide is designed so that the reflection and/or transmission of the guided wave have broad pass bands with narrow transition bands. The optical structure is exposed to an incident laser radiation with wavelength in one of the transition bands. Modulation of the incident laser radiation is controlled by the change in refractive index or absorption in the optical guided wave structure produced by the modulation voltage. The incident radiation is in transition band, instead of the center portion of the pass band. A preferred method for designing a suitable periodic optical structure having broad pass bands with narrow transition bands uses a high coupling coefficient between the periodic structure and the optical waveguide mode. Increasing the product of the coupling coefficient and the length of the grating narrows the transition region band and increases sensitivity of the modulation.

30 Claims, 9 Drawing Sheets

FIG. 3a
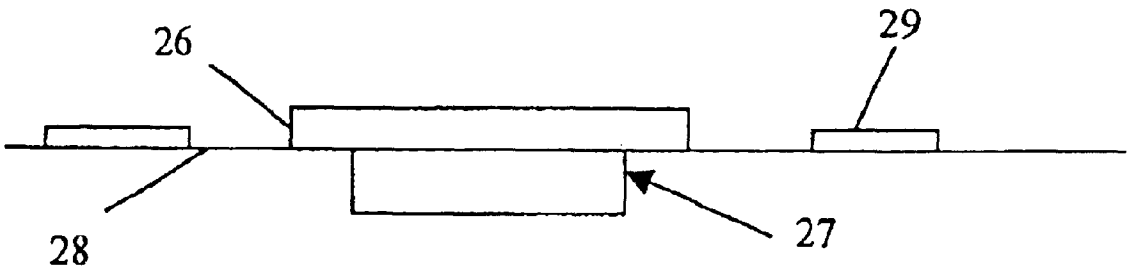
FIG. 3b
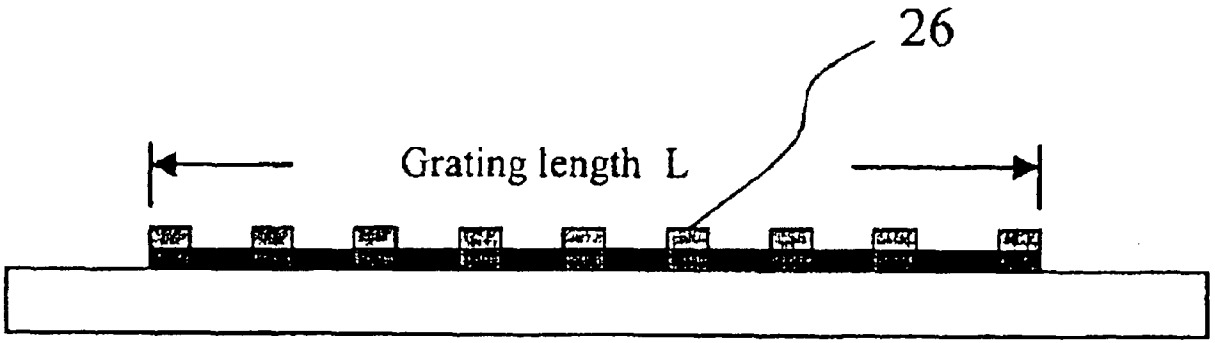
FIG. 3

$C=C_0$

METHOD FOR OPTICAL MODULATION AT PERIODIC OPTICAL STRUCTURE BAND EDGES

Matter enclosed in heavy brackets [ ] appears in the original patent but forms no part of this reissue specification; matter printed in italics indicates the additions made by reissue.

RELATED APPLICATIONS AND PRIORITY CLAIM

This application is related to prior provisional application Serial No. 60/235,584 filed Sep. 27, 2000. This application claims priority from that prior application under 35 U.S.C. §119.

FIELD OF THE INVENTION

The invention is in the optoelectronic field. The invention is applicable to optical modulation systems, including, for example, optical switching for digital signaling and small signal modulation for analog applications.

BACKGROUND OF THE INVENTION

Optical modulators are used in a variety of systems. Controlled modulation of laser light is useful in analog systems to produce an output proportional to the input signal. Digital optical systems, such as fiber optic communication systems, use optical modulators to signal digital signals. In such case, a modulator is controlled to turn on and off. Digital optical modulators as signaling devices may also form the basis for optical memories and general computer devices. Possibilities for optical modulators in both digital and analog systems are increased with increased efficiency as measured with respect to the drive voltage required to produce the desired optical modulation.

Conventional modulators follow similar radio frequency transmission theory of attaining the desired transmission or reflection over the width of the pass band, typically attempting to use the center portion of the pass band or bands of the modulator. Conventional modulation of optical waves utilizes the change of the refractive index and/or the change of the absorption coefficient as a function of applied voltage to modulate the intensity or phase of an optical wave. Example conventional devices operating in this manner over their pass bands are the Mach-Zehnder modulator, the electro-optical phase modulator, the semiconductor electro-refraction modulator, and the electro-absorption modulator. Any of these modulators would be rendered more useful by an increased efficiency as a function of drive voltage.

SUMMARY OF THE INVENTION

The method of the invention uses the band edge of periodic structures for an efficient modulation method. In the band edge region, transmission and reflection of an optical wave can be made very sensitive to the change in radiation wavelength, a change in the modulator material refractive index, and/or a change in the material absorption. Controlling these parameters with the increased level of sensitivity is provided by modulation using the band edge region.

A preferred embodiment method of the invention uses a periodic optical structure (i.e., a grating) on top of an optical waveguide structure. The combination of the periodic structure and the optical waveguide is designed so that the reflection and/or transmission of the guided wave have broad pass bands with narrow transition bands. The optical structure is exposed to an incident laser radiation with a wavelength in one of the transition bands. Modulation of the incident laser radiation is controlled by the change in refractive index or absorption in the optical guided wave structure produced by the modulation voltage. The incident radiation is in the transition band, instead of the center portion of the pass band.

A preferred method for designing a suitable periodic optical structure having broad pass bands with narrow transition bands uses a high coupling coefficient between the periodic structure and the optical waveguide mode. The larger the product of the coupling coefficient and the length of the grating, the narrower the transition region band, and the more sensitive the modulation. The periodicity is chosen (by fabrication and by applying a bias voltage) so that the wavelength for Bragg reflection of the periodic structure is offset from (i.e., mismatched to) the incident laser wavelength so that the laser wavelength is at the center of one of the transition bands. A suitable method for designing the combined structure is to vary various dimensions and materials, including grating, waveguide, and electrode, so that there is a large electro-optic change of index or absorption, a strong coupling coefficient and length product, a low insertion loss, and sufficiently fast speed of operation for the intended application.

BRIEF DESCRIPTION OF THE DRAWINGS

FIGS. 3a (cross sectional view) and 3b (side view) show a preferred embodiment device including a one-dimensional grating coupled to an optical channel waveguide;

DETAILED DESCRIPTION OF THE INVENTION

A region of the band edge (the region between the pass and stop band) including a preferably sharp transition region near the stop band edge is used for modulation of an optical wave. In this band edge region, transmission and reflection of an optical wave can be made very sensitive to the change in incident radiation wavelength, a change in the modulators material refractive index, and/or a change in the material absorption. Controlling these parameters with increased levels of sensitivity is provided in the band edge region. A small applied voltage change; for example, can lead, to a low voltage change digital switch, or a significant modulation effect in an analog device.

The high dispersion of periodic structures in the edge region of their pass and stop band is used in the invention to greatly enhance the modulation of the optical wave. In many applications, modulation is created by electro-optical changes in the material medium that include changes in either the refractive index or the absorption coefficient, or both, as a function of an applied voltage or electric field. In other applications, wavelength variation of the optical radiation is converted to amplitude variation of the optical wave, and the conversion rate can be controlled by the bias. The method of the invention may be applied to existing designs of modulators made from $LiNbO_3$, semiconductor, polymer and other materials by adding a grating in accordance with the band edge principles of the invention.

Figure 1:
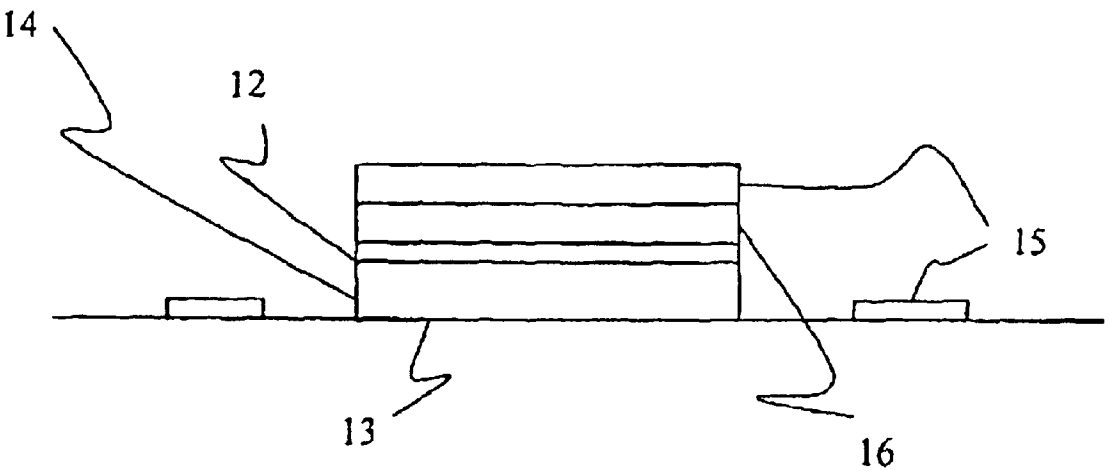
FIGS. 1a (cross sectional view) and 1b (side view) illustrate a device structure, including a waveguide and grating, to which the present invention is applied.
Figure 1:
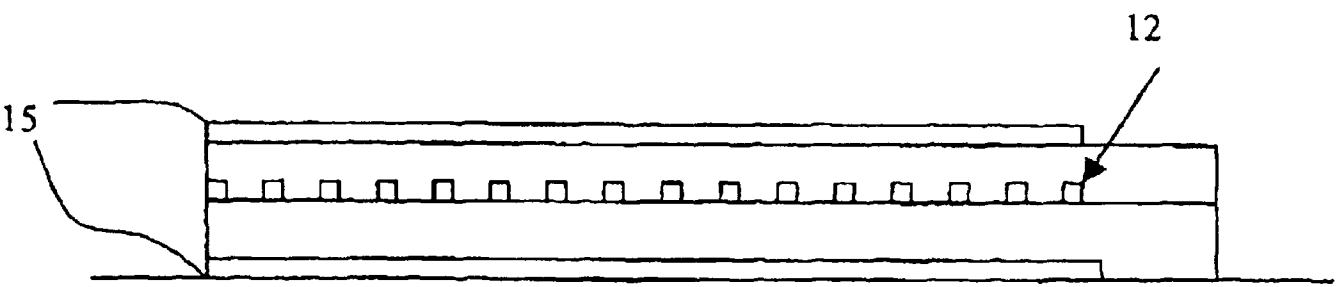

According to a preferred embodiment of invention shown in FIGS. 1a and 1b, an optical modulator 10 with a periodic grating 12 on a conductive substrate 13 is used that has its band edge region matched to an optical wavelength or wavelengths of interest. Either the transmission or reflection of an optical wave is controlled in the band edge region. The control is highly sensitive and responsive to small changes, i.e., small changes in the incident radiation wavelength, any electro-optical change of material refractive index, or any electro-optical change of the material absorption. For example, in the case of a one-dimensional grating coupled to an electro-optical channel waveguide, the sensitivity is controlled by the properties of the waveguide 14 (including residual propagation loss, the electro-optical change of the index or absorption produced by the voltage applied to electrodes 15, and the field pattern of the optical mode) and the design of the grating (including the grafting length, the grating periodicity, the dielectric constant of the grooves and cladding 16, the height of the grooves, and the shape of the grooves, and the overlap of the grating with the optical mode of propagation).

The insertion loss of the modulator is important to the overall transmission efficiency of the signals. As the temperature changes, the grating periodicity changes. The laser wavelength may also shift in time within its stability limit. The DC bias voltage may need to be adjusted continuously to assure that the laser wavelength is located at the appropriate position of the band edge. For analog modulation applications, the incident laser wavelength should be biased at the center of the transition band. For digital modulation applications, the laser wavelength should be located at the beginning edge of the transition band for the zero signal. The switching voltage of the digital system must be controlled accurately so that the modulator will be at the end of the transition band for the one signal. The accuracy of the switching voltage control may be reduced when the grating is apodized to reduce the secondary loops in the transition region. Environmental factors should also be considered as such factors may affect the effectiveness of a modulator with an enhanced ultra-sharp band edge reflection or transmission region. In designing a particular physical embodiment modulator to implement the method of the invention, such factors should be considered.

There is a trade-off between modulation efficiency and the electrical bandwidth (or switching speed) of the modulation. The electrical bandwidth (or the switching speed) will be limited by the capacitance of the device seen by the driving circuit. The capacitance is proportional to the device length. At high frequencies, there may be an additional limitation due to the transit time of the optical waves in the device. The transit time is also longer for longer L. On the other hand, the larger the L, the larger the $C_0L$ and the higher the modulation efficiency. In the design of a particular modulation device to implement the present method, it is desirable to optimize the modulation efficiency based on the electrical bandwidth required for a specific application.

Figure 2:
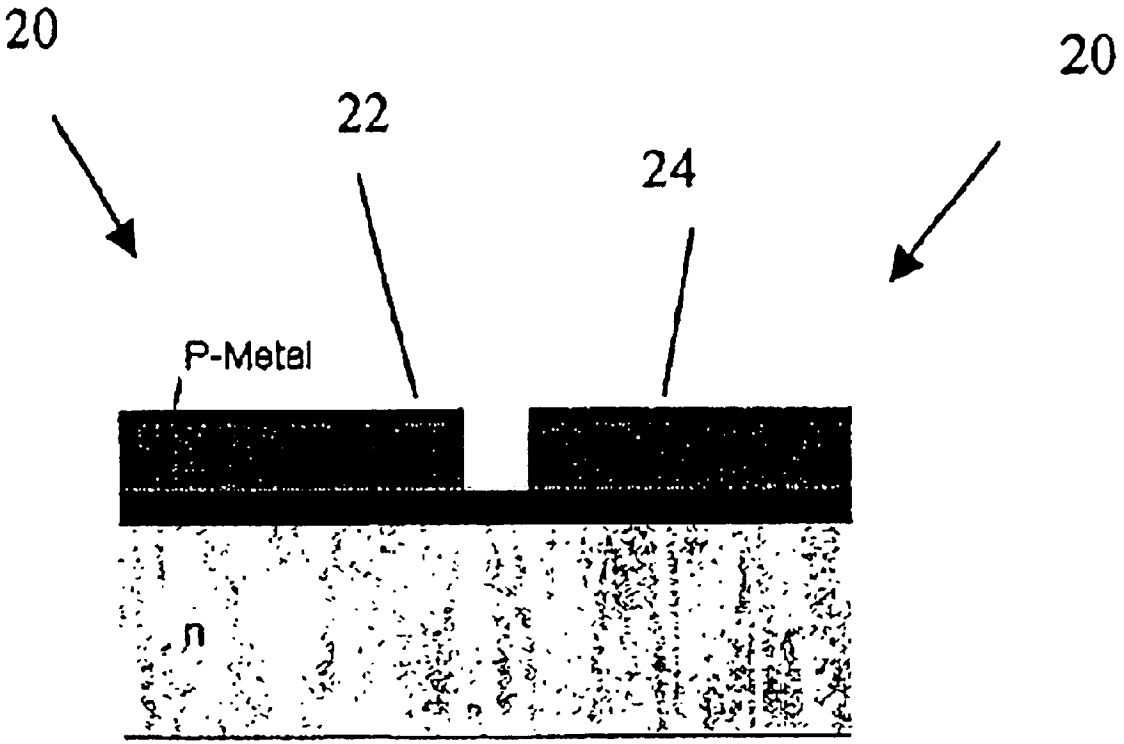
FIG. 2 shows a preferred embodiment structure including two electro-absorption modulators connected in tandem.

A particular beneficial use of the present method is for RF photonic link applications. In analog RF photo links, there are two important measures of performance. The first measure is the RF efficiency which is the ratio of the output signal power to the input signal power. The second measure is the Spurious Free Dynamic Range of the link. A large Spurious Free Dynamic Range (SFDR) is a primary system requirement. It is the range of the minimum input signal power when the signal is equal to the noise in the system to the maximum input signal power when the nonlinear distortion of the input signal becomes equal to the noise. When there are two or more signals at slightly different frequencies, the $3^{rd}$ order interference nonlinear distortion of the signals becomes the primary nonlinear distortion. SFDR will depend on the nonlinear distortion of the modulator. Thus, it is beneficial to linearize the modulator. Preferred techniques to linearize the modulation include a two-wavelength design and a split electrode design for the cancellation of the nth order nonlinearity. FIG. 2 shows a schematic diagram of the latter split electrode design, in which two modulators 20 are connected in tandem. The particular modulators 20 shown are electro-absorption modulators where an applied voltage to electrodes 22, 24 is used to shift the absorption edge in the intrinsic (i) region. Different voltages are applied on the two electrodes 22, 24. By properly choosing the voltage and the electrode lengths, certain orders of non-linearity can cancel each other. Thus the SFDR of the RF optical fiber link can be increased.

A preferred example that illustrates the principles of the present method will now be discussed. This example, shown in FIGS. 3a and 3b, is a one-dimensional grating 26 coupled to an optical channel waveguide 27 that has an efficient electro-optical change of index. In this example, the waveguide has no residual propagation loss. As before, material properties, including substrate 29, and voltage applied to electrodes 29 affect performance. There can be various choice of materials for the channel waveguide, different configurations for the grating grooves and material and different configurations for the electrode.

The pass and stop bands of such a grating depend on the coupling coefficient $C_0$ of the grating with respect to the optical guided wave mode. For grating corrugation with rectangular grooves, $C_0$ is given approximately by $$C_0 \approx \frac{\omega}{2}\Delta\varepsilon h\int_0^w dy\left|e\left(\frac{d}{2}, y\right)\right|^2. \tag{1}$$

where $\omega$ represents the optical angular frequency; $\Delta\epsilon$ is the change in the dielectric constant in the grating corrugation; and h, W are the grating corrugation height and width, respectively. $h\int_0^w dy|e(d/2, y)|^2$ represents the portion of the light intensity over the grating area. The larger the h, $\Delta\epsilon$ and $|e|^2$, the larger the $C_0$. When a voltage is applied to the optical waveguide via the two electrodes 29, it creates an electric field. There will be a change of the effective index of the optical waveguide mode produced by the electric field.

Figure 4:
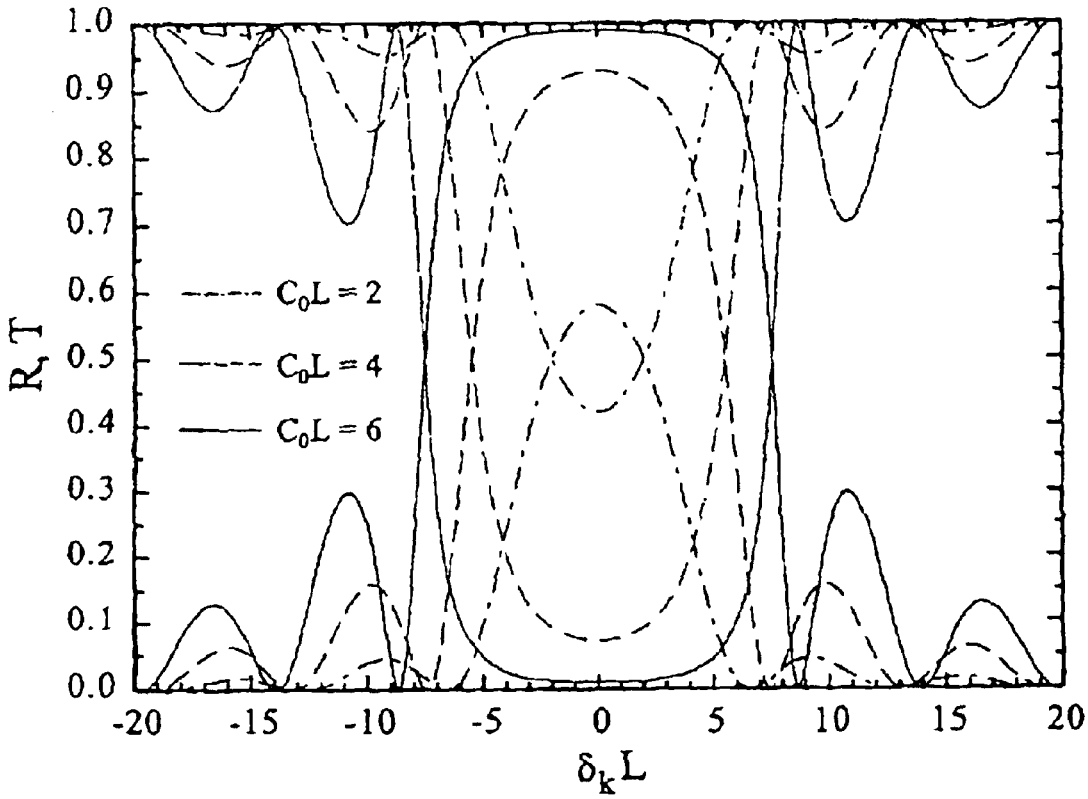
FIG. 4 is a simulation result of structure shown in FIG. 3.

FIG. 4 is a simulation result of the FIG. 3 structure. It shows the variation of the reflectivity (and transmission) of the device at various $\delta_k L$ values for several coupling strength $C_0L$. $\delta_k L$ is $2\pi$ times the off-set of the number of half-wave number in the optical waveguide to the number of the grooves in the grating, as discussed in the text. The $\delta_k$ is controlled by the grating periodicity $\Delta$, the effective index of the waveguide mode and the free space wavelength of the optical guided wave. The stop band is the broad high reflectivity (or low transmission) main lobe around $\delta_k L=0$, and the pass band is the low reflectivity (or high transmission) region at $\delta_k L>20$. The band edge is between the pass and the stop bands. There are two secondary lobes shown in the transition region in this figure.

FIG. 4 shows the reflection and the transmission of the waveguide with a grating overlay of length L as a function of $\delta_k$, the mismatch from the Bragg condition. $\delta_k$ has two parts. There is a bias $\delta_{k0}$ (created by the effective index of the optical guided wave at free space wavelength $\lambda$ under the applied bias voltage in the absence of the signal voltage) and a signal $\delta_{ks}$ (created by the modulation voltage).

$$\delta_k = \delta_{k0} + \delta_{ks}$$

$$\delta_{k0} = 2\pi\left(\frac{2n_{eff,bias}}{\lambda} - \frac{1}{\Lambda}\right),$$

$$\delta_{ks} = \frac{4\pi\Delta n_{eff}}{\lambda}$$

where $\Lambda$ is the grating periodicity, $n_{eff,bias}$ is the effective index of the guided wave with the bias voltage applied, and $\Delta n_{eff}$ is the change of effective index created by the modulation voltage. The effective index of the guided wave, $n_{eff}$, is the sum of $n_{eff,bias}$ and $\Delta n_{eff}$. In other words, $\delta_k L$ is $2\pi$ times the off-set of the number of half-wave number in the optical waveguide, under the grating at the applied voltage, to the number of the grooves in the grating. The Bragg reflection occurs at $\Delta=\lambda/2n_{eff}$, i.e. $\delta_k=0$. As $\delta_k$ is shifted from the bias value by the change of effective index of the guided wave mode due to the electro-optical effect of the modulation voltage, the reflection or the transmission of the optical intensity coupled from the waveguide to the fibers is changed.

At large $C_0L$ where L is the length of the grating, the width of the pass band is broadened while the center of the stop band does not change. The result is a very rapid variation from pass to stop band (i.e., the transition) as a function of both the wavelength and the effective index of the waveguide. The larger the $C_0L$, the sharper is the transition. With the method of the invention using a large $C_0L$ and a wavelength $\lambda$ and $n_{eff,bias}$ such that $\delta_{k0}$ is within the band edge region at the sharp transition between pass and stop bands, a small change of the effective index will now lead to a very large change of transmission or reflection from pass to stop band. In implementing the invention for analog modulation, $\delta_{k0}$ is preferably biased to the value that yields the largest slope, i.e. $dR/d\delta_k$ or $dT/d\delta_k$. For digital modulation, $\delta_{k0}$ is preferably biased to yield the highest on/off ratio with a smallest change of $\delta_k$ Because of the existence of the secondary lobes, the switching voltage needs to be controlled to yield a high on/off ratio. Secondary lobes of R or T can be suppressed by apodization of grating periodicity.

In addition to the grating, the most effective design of the waveguide and the electrodes will cause a most effective change of the effective index of the optical waveguide mode by the applied signal voltage, in conformity with obtaining a large $C_0$ and within the bandwidth allowed by the capacitance and the transit time. The larger the $\Delta n_{eff}$ for a given modulation voltage, the larger the modulation efficiency. There are number of known optical waveguide materials and structures such as the $LiNbO_3$ and polymer waveguides in addition to new waveguide materials that will be a good candidate for the channel waveguide. The electrode design should be configured and optimized separately for each case.

Though the one-dimensional grating and $LiNbO_3$ waveguide provides below an important example of the use of the method of the invention, the invention may be applied to any material, waveguide structure and electrode design that has an electro-optical change of index. It can also be applied to materials that have electro-absorption effects. Though the reflector modulator is used as an example to illustrate the band edge region modulation, transmission modulators may also be used in accordance with the method of the invention. The performance of transmission modulators will be similar to the reflection modulators. For reflection modulation, a circulator is required between the laser and the modulator. For transmission modulation, an isolator is required between the laser and the modulator.

For most optical waveguides, the electrical properties of the two electrodes can be represented as a capacitor associated with resistors. The actual voltage from the RF modulation source required to achieve a given electric field depends on the circuit properties of the device and the driving circuit. There will be a drop of the electric field at high frequencies due to the RC effect in circuits. This is the primary cause of the bandwidth restriction. The other cause is the transit time required for the optical energy to decay to a low level. The transit time and the capacitance can be reduced by decreasing L. On the other hand, there is a limit of how large a coupling coefficient $C_0$ between the grating and the optical mode can be obtained. The smaller the $C_0L$, the less sensitive the modulation. Therefore, there will be a trade-off between $V_\pi$ and the bandwidth.

The invention is generally practiced through matching the bias effective index and the wavelength to the band edge region, and may be enhanced through optimizing the shape of the band edge region of the modulator. Five major design considerations may be applied to perfect an optimization for a given practical embodiment and set of wavelengths of interest:

(1) The larger the $C_0L$ product, the more sensitive the modulation. On the other hand, the smaller the L, the larger the bandwidth. Thus, one of the important design considerations of such a modulator is to design the waveguide and the grating to obtain as large a $C_0$ as possible. For polymer and $LiNbO_3$ waveguides, various known material parameters and fabrication techniques can be used to obtain a large $C_0$.

(2) Obtaining as large a $\Delta n_{eff}$ as possible for a given voltage. Again, for the $LiNbO_3$ and polymer waveguides, the $\delta_k$ as a function of applied voltage can be obtained based on the known electro-optical coefficients and the electrode and waveguide designs.

(3) In a more detailed analysis of R or T, the sharpness of the transition region is reduced significantly by higher propagation loss. The slope, $dR/d\delta_k$ or $dT/d\delta_k$, is reduced as the propagation loss increases. Therefore, the third major design consideration is to reduce the propagation loss and to achieve the best performance for a given propagation loss. The realization and the assessment of the effect of propagation loss will guide the development of material and fabrication technology for manufacturing. We also discovered that for a given effective absorption coefficient, $\alpha_{eff}$, there is an optimum $L_{opt}$ that yields the largest slope. However, whether the optimum $L_{opt}$ should be used for a given application depends on other design considerations such as the bandwidth to be discussed in (4)

(4) The voltage will be applied to the modulator electrode across the grating via the RF and microwave circuit. For the modulator designed as a lumped circuit element, it is basically a capacitance C in the electrical circuit. There will be a drop of the voltage applied to the modulator at higher frequencies due to the circuit property, called the RC effect. The frequency range from DC to the frequency at which the modulator voltage is dropped to $1/\sqrt{2}$ of its peak value at DC is called the broadband bandwidth of the modulator. The larger the C, the smaller the bandwidth. On the other hand, C is proportional to the length of the electrode that equals to the length of the grating L. Therefore, the larger the bandwidth required for a specific application, the shorter must be the L. L affects the modulation slope, $dR/d\delta_k$ or $dT/d\delta_k$, or the "on/off $\delta_k$" because it affects the $C_0L$, $\alpha_{eff}L$ and $\delta_kL$ values. For this reason, the fourth major design consideration is to optimize the design based on the required L.

(5) For external modulators inserted into optical fiber links, the insertion loss of the modulator is the fifth major design consideration. For analog links, the RF link efficiency is proportional to the product of modulation slope efficiency and the insertion efficiency at the bias voltage. For digital links, the insertion efficiency at the "on" state of the modulator determines the optical power that can be distributed and transmitted. The on/off ratio determines the signal to noise ratio at the receiver. The insertion efficiency $t_m$ will depend on the modulator (including the grating) design as well as external factors such as the insertion loss of the circulator used for reflection modulators, the coupling loss to the fibers, etc.

For illustration purposes, the invention has been illustrated primarily in terms of the electrode designed as a lumped electrical circuit element. There are other electrical designs that will avoid the RC bandwidth limit. For example, an impedance matching circuit may be employed to give high modulation efficiency over a narrow band of frequency around a high center frequency using a modulator with a larger L. The traveling wave electrode design is the traditional way to increase the bandwidth without requiring a shorter L at high frequencies. However, the traveling wave electrode will not work well for a resonant modulator based on the interaction of forward and backward propagating waves. In addition to the RC limitation in bandwidth, there is a transit time limitation to the bandwidth of a modulator. For a grating modulator, it takes a finite amount of time (i.e. the transit time) for the interaction between forward and backward propagating wave to reach equilibrium or to decay.

Modulation of R or T is also obtained when the absorption coefficient $\alpha$ is changed by the applied voltage. In semiconductors, a large change of absorption coefficient, called the electro-absorption effect, can be obtained in material structures such as the multiple quantum well structures. Simultaneously, there will be change of index of refractive index called the electro-refraction. Electro-absorption and electro-refraction effects occur simultaneously. However, materials structures can be designed to optimize electro-absorption or to optimize electro-refraction. The optimization of the modulation efficiency using a grating in the transition band with a semiconductor waveguide that has strong electro-absorption and/or electro-refraction is another potential application of this invention. In analog applications, linearization of the R or T curve near the bias point will be an important design consideration to increase the Spurious Free Dynamic range. In digital applications, apodization of the grating will be considered to reduce the sensitivity of the on/off ratio to the switching and bias voltages.

An Example of Optical Modulation at the Band Edge of Periodic Structures on $LiNbO_3$ Waveguides The Mach-Zehnder $LiNbO_3$ modulator has been used for external modulation in many fiber optical applications. There is keen interest in any technique that will increase its modulation efficiency so that the fiber optical communication systems can be operated with much lower driving voltage. The technique of optical modulation at the grating band edge may offer such important improvements. It is demonstrated by simulation here.

Figure 5:
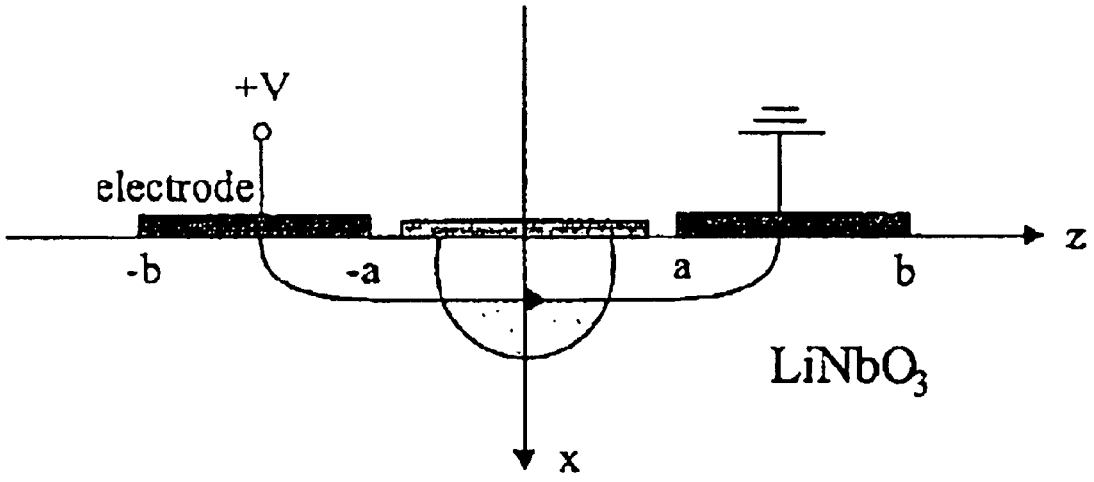
FIG. 5 shows a periodic grating on top of typical x-cut $LiNbO_3$ channel waveguide with electrode configuration and Ti diffused channel.
Figure 6:
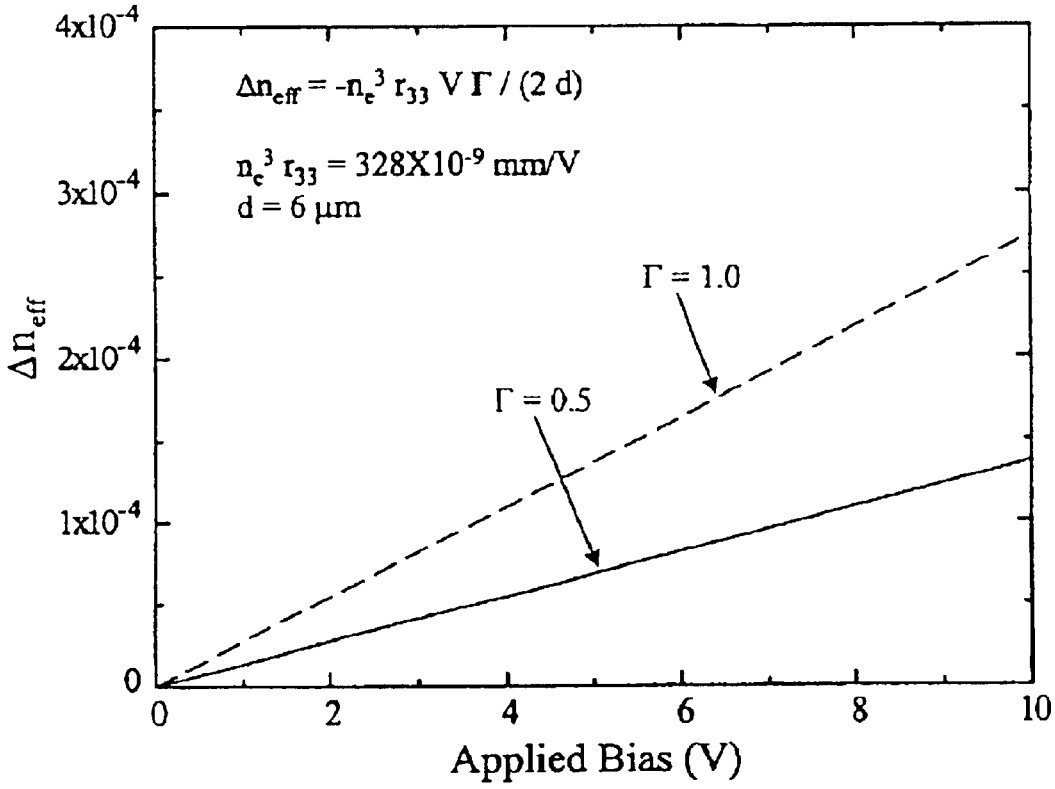
FIG. 6 is a plot of effective index change as a function of the electrical bias voltage for two different overlap integral values, Γ, for the modulator shown in FIG. 5.
Figure 7:
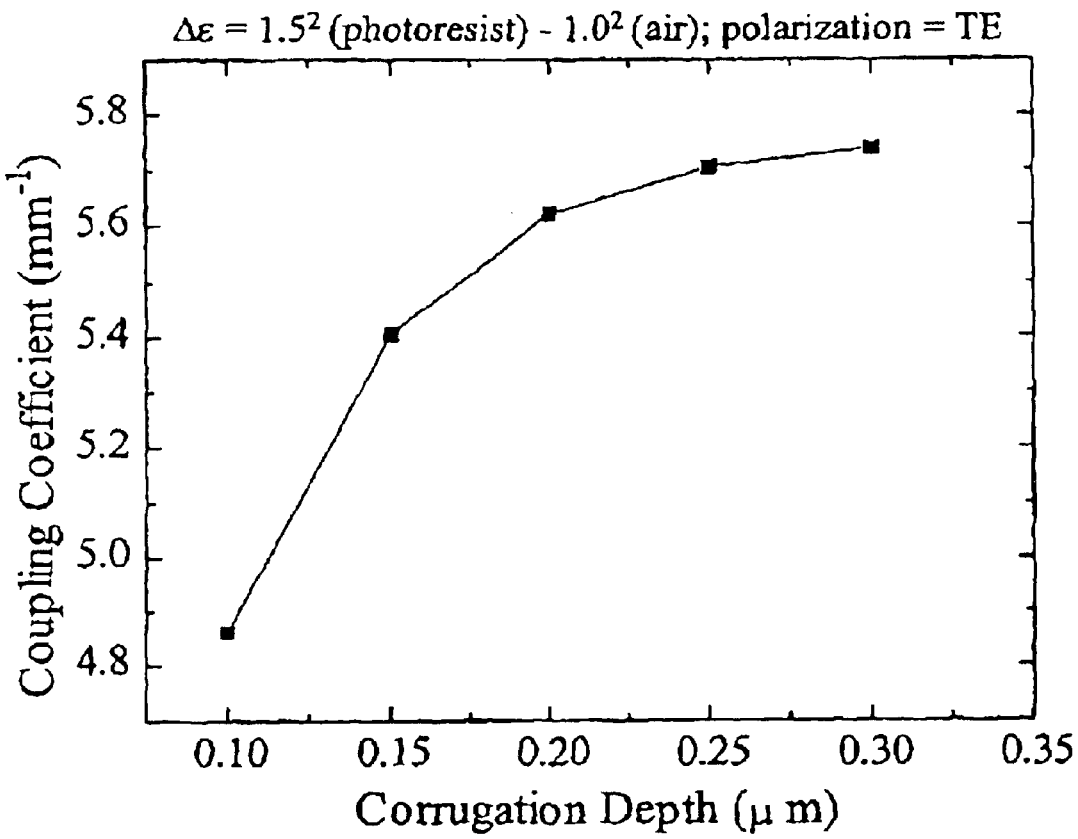
FIG. 7 is a plot of coupling coefficient $C_0$ for the grating of FIG. 5 that has photo resist spun or $SiO_2$ deposited on top of the $LiNbO_3$ channel waveguide.

A typical x-cut $LiNbO_3$ channel waveguide phase modulator with electrode configuration and Ti diffused channel is shown in FIG. 5. The change of the effective index of the $TE_{00}$ mode as a function of the voltage applied to the electrodes is shown in FIG. 6. Although different designs of the electrode and the channel may give a different effective index curve, the performance of the electro-optical change of effective index can be illustrated in terms of the curves in FIG. 6 without any loss of generality. The simulation is done for the 1.3 μm wavelength. For such a waveguide with a grating fabricated in polymers or in $SiO_2$ (index=1.5) on top, the $C_0$ as a function of the grating corrugation depth is shown in FIG. 7. Since the grating periodicity for Bragg reflection at the 1.5 μm wavelength is approximately 3.5 μm, the corrugation depth that can be etched effectively by conventional methods without special etching technique is less than 3.5 μm. Since the guided wave mode decays exponentially in the low index cladding, the $C_0$ value saturates at large corrugation depth. If a high index material such as titanium oxide is used as the grating material, larger $C_0$ can be obtained without saturation. An alternative is to use reactive ion etch techniques to etch a grating directly into the $LiNbO_3$ waveguide.

Figure 8:
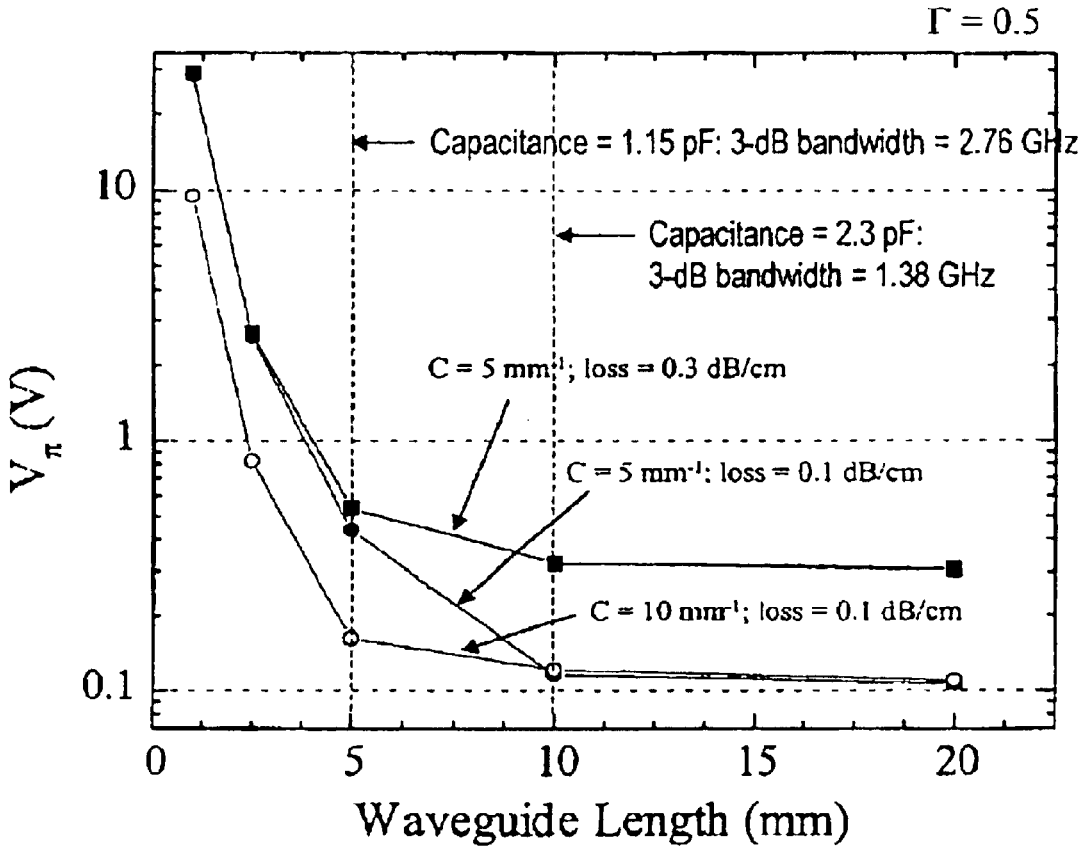
FIG. 8 is a plot of the simulated equivalent $V_\pi$ for various $LiNbO_3$ Band Edge modulators as a function of the grating and electrode length for several coupling coefficients $C=C_0$ and waveguide propagation loss.
Figure 9:
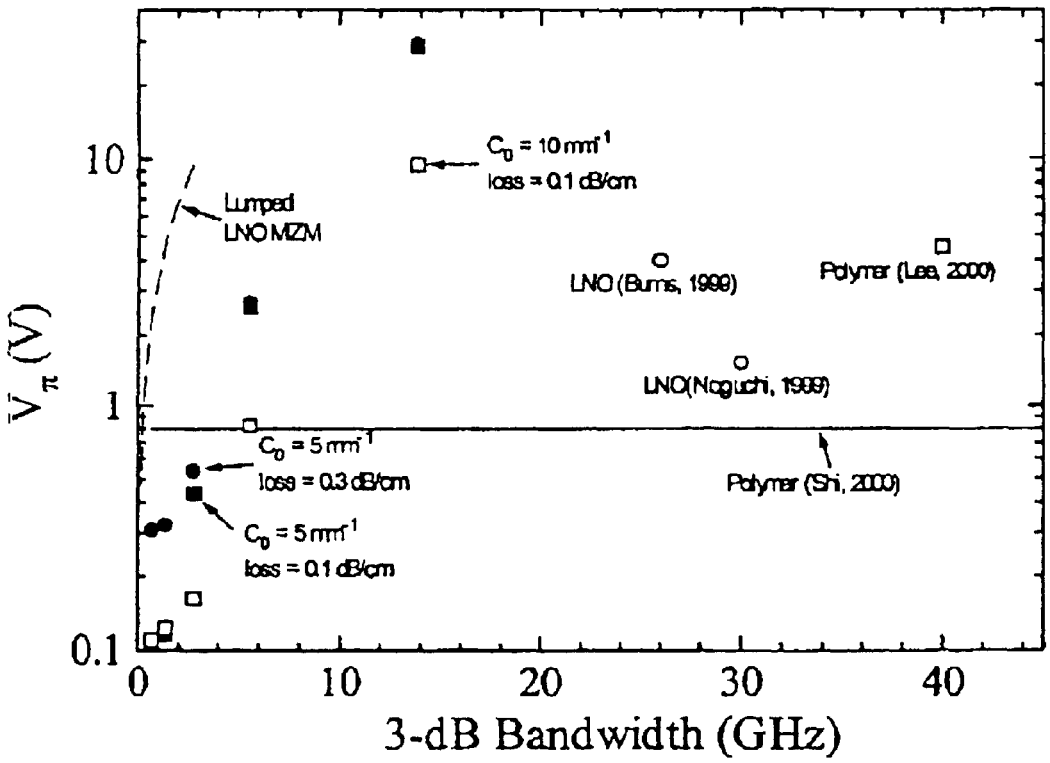
FIG. 9 is a plot of the comparison of equivalent $V_\pi$ at various 3-dB RC bandwidth for various types of $LiNbO_3$ and polymer modulators.

FIG. 8 shows the equivalent $V_\pi$ of a reflection band edge modulator as a function of grating length at $C_0$=5 $mm^{-1}$ for waveguide propagation loss at 0.1 and 0.3 dB/cm. FIG. 8 is an illustration of the modulation efficiency, measured in terms of the equivalent $V_\pi$, that can be obtained for typical cases. Here, the equivalent $V_\pi$ is defined as $\pi/(|2dR/dV|)$ for analog modulation. Larger $C_0$ and lower loss will yield better performance. For digital modulation, the $V_{mod}$ is the voltage swing from the "on" state to the "off" state. The digital $V_{mod}$ is roughly three times the equivalent $V\pi$. Based on the electrode configuration shown in FIG. 5, the capacitance per unit length of a lumped element electrode can be calculated. The calculated bandwidth of the RC effect at L=5 and 10 mm are also shown in this figure. Small propagation loss does not reduce $V\pi$ much for L less than 5 mm. For L<5 mm, an increase of $C_0$ would be effective in reducing $V_\pi$. On the other hand, for L≧10 mm, the effect of propagation loss is pronounced. FIG. 9 shows the $V_\pi$ as a function of the RC limited bandwidth for the common-case grating band edge modulators in comparison with other $LiNbO_3$ and polymer modulators. (S.-H. Lee et al., IEEE J. Quantum Electron., vol. 36, no. 5, pp. 527–532, 2000; Y. Shi et al., Appl. Phys. Lett., vol. 77, no. 1, pp. 1–3, 2000; W. K. Burns et al., J. Lightwave Technol., vol. 17, no. 2, pp. 2551–2555, 1999; K. Noguchi et al., in Technical digest of CLEO/Pacific Rim '99, vol. 4, (IEEE, Piscataway, N.J.), pp.1267–1268, 1999.) Even with $C_0$=5 $mm^{-1}$ at 3 GHz bandwidth, the $V_\pi$ of the band edge modulator is lower than other comparable modulators. A large reduction in $V_\pi$ is achievable at lower bandwidth. If a large $C_0$ can be obtained (e.g., using the $TiO_2$ material or etched grating), the $V_\pi$ can be even lower, and to the modulator can have a larger bandwidth. However, because of the bandwidth limitations, it is unlikely that the $V_\pi$ of the grating band edge modulator can be better than the traveling wave modulators at 30 or 40 GHz bandwidth.

Optical Modulation at the Band Edge of Periodic Structures in Other Electro-optic Channel waveguides The band edge effect of periodic structures can also be applied to semiconductor channel waveguides. In addition, besides the normal electro-optic change of index far away from the absorption of the material, some semiconductor waveguide materials have Frantz-Keldysh or Quantum Confined Stark Effect near their absorption band edge or exciton absorption. These materials may exhibit very strong changes in absorption as a function of the applied electric field called the electro-absorption effect and/or very large changes in refractive index as a function of the applied electric field called the electro-refraction effect. Using the band edge dispersion coupled with vary large electro-absorption and/or electro-refraction may yield much more effective modulation than either $LiNbO_3$ or polymer waveguides. The obvious long term advantage of semiconductor modulator is its potential for integration with other optical components such as laser and/or integration with electronic driver or detector circuits on the same chip.

A polymeric waveguide modulator is potentially attractive for many optical fiber applications. It has many potential advantages. For example, polymer material can be coated easily on other materials. It can be used to integrate electronic circuits with optical modulators. The difference between microwave and optical index of polymers is much smaller than $LiNbO_3$. Therefore the bandwidth limitation in traveling wave devices due to microwave and optical phase mismatch is much smaller.

Polymeric waveguides differ from $LiNbO_3$ waveguides in their material properties. They are made from low index materials. Different material properties are obtained by different synthesis and pulling processes. It is necessary to consider the effect of both the TE and the TM propagating modes, variations in electro-optical coefficients and different propagation losses. The primary disadvantages of current polymeric waveguides are their large propagation loss and moderate electro-optical coefficient. Typical propagation loss and electro-optical coefficients are ~1.5 dB/cm loss and 28 pm/V EO coefficient for the TM mode, and ~0.75 dB/cm loss and 9 pm/V EO coefficient for the TE mode. Since the material properties are being improved continuously, simulation and demonstration of modulation at the band edge of periodic structures constitute an ongoing project.

Many applications of the invention are possible. The foregoing examples are provided for illustrative purposes. Potentially, many fiber optical links using external modulation of the loser power may use this device instead of the existing devices. Thus the potential number of uses is very large, including telecommunication, CATV, wireless communication, RF photonic links, phased array, antenna remoting, sensor, etc.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for optical modulation, the method comprising steps of:

employing an optical modulator including a waveguide and a grating upon the waveguide, said optical modulator having its band edge region matched to an optical wavelength of interest for modulation; and controlling one of the transmission and reflection of an optical wave from said optical modulator near the band edge region.

2. The method according to claim 1, wherein said step of controlling comprises monitoring and controlling a wavelength of incident radiation used to stimulate the transmission and reflection from said optical modulator.

3. The method according to claim 1, wherein said step of controlling comprises changing a material refractive index of the optical modulator.

4. The method according to claim 1, wherein said step of controlling comprises changing a material absorption index of the optical modulator.

5. A method for optical modulation using a periodic optical structure having a waveguide and a grating structure with broad pass bands and narrow transition bands, the method comprising steps of:

exposing the periodic optical structure to an incident laser wavelength in the middle of one of the transition bands or at the beginning of one of the transition bands;

controlling modulation of the incident laser at a given wavelength by applying a modulation voltage to the periodic optical structure.

6. The method for optical modulation according to claim 5, wherein the periodic optical structure comprises a one-dimensional optical grating coupled to a parallel optical waveguide.

7. The method according to claim 6, wherein the optical grating has a coupling coefficient and length to create wide pass bands with rapid transitions from pass to stop bands as a function of effective index of the waveguide.

8. The method according to claim 5, wherein the waveguide comprises a $LiNbO_3$ waveguide and the grating is formed upon a $SiO_x$ or polymer buffer layer.

9. A method for designing a periodic optical structure having broad pass bands with narrow transition bands, the optical structure being suited for optical modulation at a band edge of the narrow transition bands, the optical structure including a waveguide and an optical grating, the method comprising steps of choosing a high coupling coefficient for the waveguide material;

choosing a bias voltage applied to the optical waveguide and a grating periodicity so that its Bragg wavelength is mismatched with the laser wavelength, and selecting a grating length to enhance modulation efficiency.

10. The method according to claim 9, wherein said step of selecting comprises optimizing the grating length to achieve a high on/off modulation ratio with a smallest change of effective index by the signal voltage.

*11. A method, comprising:*

*providing light to an optical modulator having a first transition band between a pass band and a stop band;*

*controlling transmission of said light in or near the first transition band.*

*12. The method of claim 11, wherein said modulator includes a periodic optical structure coupled to an optical waveguide.*

*13. The method of claim 11, wherein said controlling includes controlling a wavelength of said light.*

*14. The method of claim 11, wherein said controlling includes changing a refractive index of said modulator.*

*15. The method of claim 11, wherein said controlling includes changing an absorption of said modulator.*

*16. A method, comprising:*

*providing light to an optical modulator having a first transition band between a pass band and a stop band;*

*controlling reflection of said light in or near the first transition band.*

*17. The method of claim 16, wherein said modulator includes a periodic optical structure coupled to an optical waveguide.*

*18. The method of claim 16, wherein said controlling includes controlling a wavelength of said light.*

*19. The method of claim 16, wherein said controlling includes changing a refractive index of said modulator.*

*20. The method of claim 16, wherein said controlling includes changing an absorption of said modulator.*

*21. A method, comprising:*

*providing light having a first wavelength to an apparatus that includes a periodic optical structure and an optical waveguide, wherein said apparatus has a first transition band between a pass band and a stop band, and wherein said first wavelength is in the beginning or the middle of said first transition band;*

*applying a voltage to the apparatus in order to modulate said light within said first wavelength.*

*22. The method of claim 21, wherein said applied voltage changes a refractive index of said apparatus.*

*23. The method of claim 21, wherein said applied voltage changes an absorption of said apparatus.*

*24. The method of claim 21, wherein said periodic optical structure is a grating, and wherein said light is incident laser radiation.*

*25. An optical modulation system comprising:*

*an optical waveguide;*

*a periodic optical structure coupled to said optical waveguide to provide an optical modulator having a first transition band for incident light, the first transition band being between a pass band and a stop band;*

*said optical modulator being responsive to voltage for controlling transmission of the incident light for said optical modulator in or near said first transition band.*

*26. The optical modulation system of claim 25, wherein said voltage controls a wavelength of said incident light.*

*27. The optical modulation system of claim 25, wherein said voltage changes a refractive index of said optical modulator.*

*28. The optical modulation system of claim 25, wherein said voltage changes an absorption of said optical modulator.*

*29. The optical modulation system of claim 25, further comprising:*

*a source for said voltage.*

*30. The optical modulation system of claim 25, wherein said periodic optical structure comprises a grating.*

* * * * *

UNITED STATES PATENT AND TRADEMARK OFFICE

CERTIFICATE OF CORRECTION

PATENT NO. : RE41,644 E
APPLICATION NO. : 11/498912
DATED : September 7, 2010
INVENTOR(S) : Chang et al.

It is certified that error appears in the above-identified patent and that said Letters Patent is hereby corrected as shown below:

In the Specification:

Col. 8, line 57

Please delete "to" and insert --so-- therefor.

Signed and Sealed this
Twenty-second Day of February, 2011

David J. Kappos

David J. Kappos
*Director of the United States Patent and Trademark Office*